United States Patent [19]

Drouillard et al.

[11] 4,440,442

[45] Apr. 3, 1984

[54] SEAT POSITION CONTROL MECHANISM

[75] Inventors: James R. Drouillard, Rochester; Richard W. A. Rees, West Bloomfield, both of Mich.

[73] Assignee: General Motors Corporation, Detroit, Mich.

[21] Appl. No.: 347,689

[22] Filed: Feb. 11, 1982

[51] Int. Cl.³ .......................... B60N 1/02; B60N 1/04
[52] U.S. Cl. ................................. 297/341; 297/329; 248/430
[58] Field of Search ............... 297/341, 346, 317, 318, 297/329; 248/429, 430, 420

[56] References Cited

U.S. PATENT DOCUMENTS

| | | |
|---|---|---|
| 2,715,433 | 8/1955 | Dolgorukov . |
| 2,725,092 | 11/1955 | Cartwright .......................... 248/430 |
| 3,355,211 | 11/1967 | Kölle ................................... 297/346 |
| 3,695,695 | 10/1972 | Colucci ............................... 297/341 |
| 3,940,182 | 2/1976 | Tamura . |
| 4,101,169 | 7/1978 | Muraishi et al. . |

FOREIGN PATENT DOCUMENTS 2724048 12/1978 Fed. Rep. of Germany ...... 297/341

Primary Examiner—James T. McCall
Assistant Examiner—Mark W. Binder
Attorney, Agent, or Firm—Herbert Furman

[57] ABSTRACT

A seat position control mechanism includes an inboard slave track arrangement having a single track assembly and an outboard control track arrangement having a pair of the same track assemblies arranged in vertically stacked relationship. One of the outboard track assemblies provides for horizontal adjustment of the seat and the other provides for movement of the seat to and from an easy enter position. A control cable arrangement interconnects a tilting seat back and a latch mechanism for the other outboard track assembly to release a latch mechanism and permit movement of the seat to the easy enter position.

3 Claims, 7 Drawing Figures

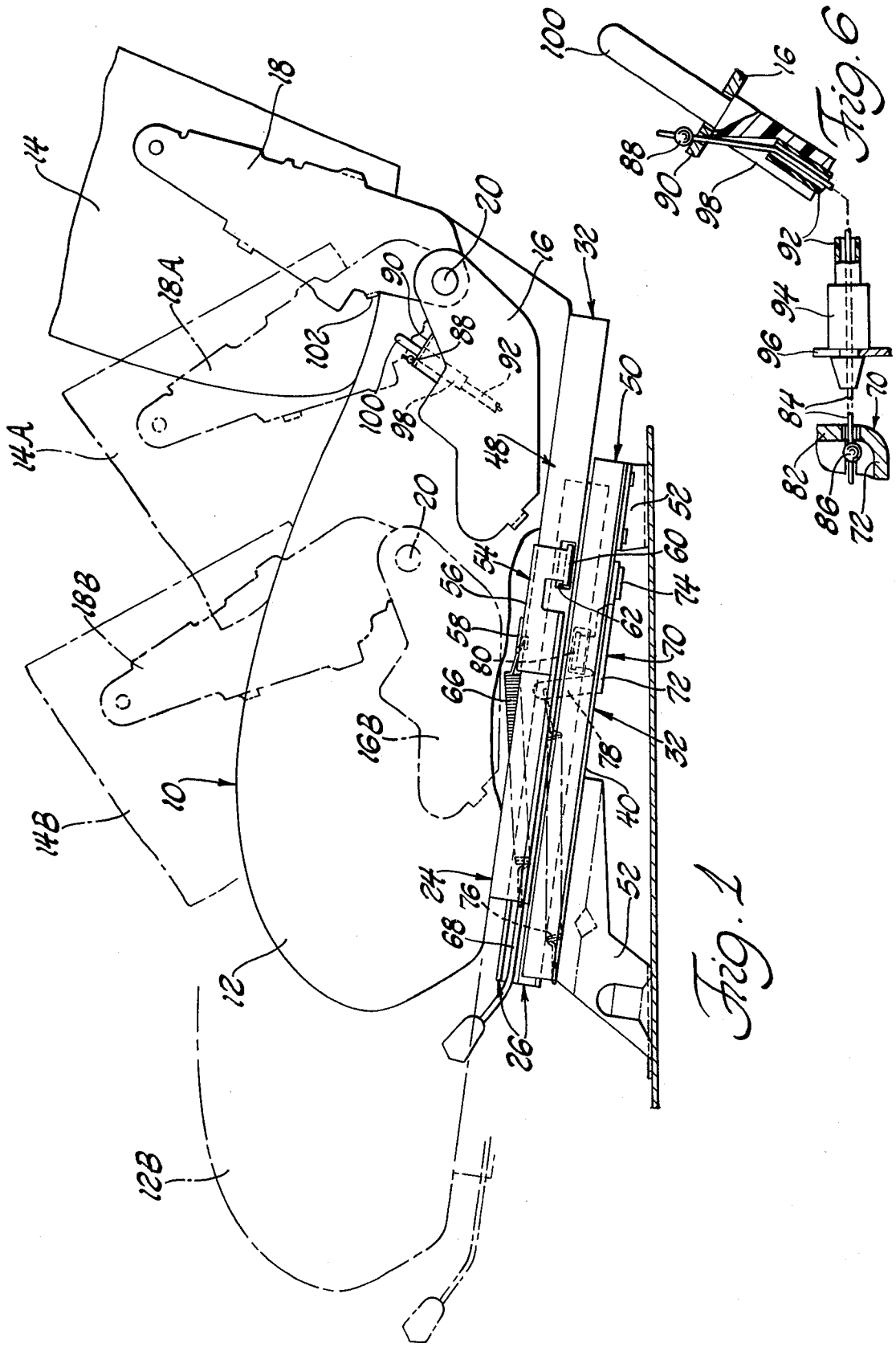

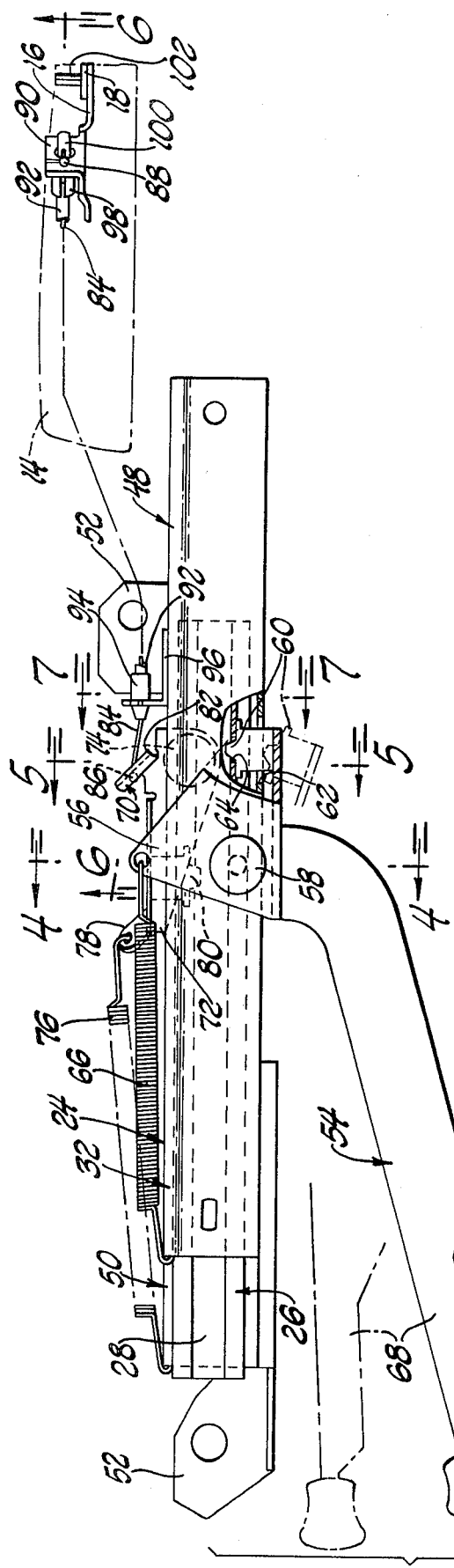

SEAT POSITION CONTROL MECHANISM

This invention relates to seat position control mechanisms and more particularly a seat position control mechanism for moving a vehicle seat to a plurality of horizontal adjusted positions and from any one of the horizontal adjusted positions to an easy enter position and return to the one horizontal adjusted position upon tilting movement of the seat back.

Seat position control mechanisms of this general type are known in the prior art. The mechanism of this invention differs from prior art mechanisms in several features.

One feature is that the mechanism includes an inboard slave track arrangement which includes a single track assembly having a lower first generally U-shaped track member mounted to the vehicle and an upper second U-shaped track member slidably enveloping the lower first track member and mounted to the seat. The mechanism further includes an outboard control track arrangement which includes a pair of the same track assemblies as in the inboard slave track arrangement. These track assemblies are arranged in an upper and lower vertically stacked relationship. The lower track assembly is inverted and has the base of the first track member thereof secured to the base of the first track member of the upper track assembly. The second track member of the upper track assembly is mounted to the seat while the second track member of the lower track assembly is mounted to the vehicle. The inboard slave track arrangement is thus tied to the outboard control track arrangement through the seat and both arrangements mount the seat on the vehicle for horizontal movement with respect thereto.

A first latch mechanism is provided to lock the second track member of the outboard upper track assembly to the first track member thereof at a number of locations in order to fix the horizontal adjusted positions of the seat. A second latch mechanism is provided to lock the first track member of the lower outboard assembly to the second track member thereof at only a single location in order to lock the seat in one position.

Release of the first latch mechanism permits horizontal adjustment of the seat as the second track member of the inboard track assembly slides relative to the first track member thereof and the second track member of the upper outboard track assembly slides relative to the first track member thereof and to the lower outboard track assembly. Release of the second latch mechanism upon forward tilting movement of the seat back permits displacement of the seat forwardly from an initial starting position to an easy enter position as the second track member of the inboard track assembly moves relative to the first track member thereof, and the upper outboard track assembly and the first track member of the lower outboard track assembly move as a unit relative to the second track member of the lower outboard track assembly. Upon return of the seat back to its normal upright position and rearward movement of the seat, the seat will stop at the initial starting position when the second latch mechanism again locks the first track member of the lower outboard track assembly to the second track member thereof.

Another feature of this mechanism is the control cable arrangement which connects the tilting seat back with the second latch mechanism to release this latch mechanism upon forward tilting movement of the seat back from upright position so that the seat can be displaced forwardly to the easy enter position and returned to the initial starting position upon return of the seat back to the normal upright position. The control cable arrangement includes a cable having one end thereof fixed to the latch member of the second latch mechanism and the other end thereof fixed to the seat. The latch member is biased to locked position. The cable slides in a sheath having a respective one end thereof fixed to the second track member of the lower outboard track assembly and the respective other end thereof slidably secured to the seat. Upon tilting movement of the seat back, an abutment thereof engages the other end of the sheath so as to bend the sheath and thereby in turn bend and shorten the cable to move the latch member of the second latch mechanism to released position against its bias. This permits movement of the seat from an initial starting position to the easy enter position. Upon return of the seat back to the normal upright position, the abutment is disengaged from the other end of the sheath and the latch member is returned to locked position when the seat moves rearwardly to the initial position.

These and other features of the invention will be readily apparent from the following specification and drawings wherein:

FIG. 1 is a side elevational view of a vehicle seat mounted on a vehicle by a seat position control mechanism according to this invention, with the seat being shown in full lines in a horizontal adjusted position and in dash lines in the easy enter position.

FIG. 2 is a partial top plan view.

FIG. 3 is a sectional view taken generally along the plane indicated by line 3—3 of FIG. 2.

FIG. 4 is a sectional view taken generally along the plane indicated by line 4—4 of FIG. 2.

FIG. 5 is a sectional view taken generally along the plane indicated by line 5—5 of FIG. 2.

FIG. 6 is a sectional view taken generally along the plane indicated by line 6—6 of FIG. 2, and FIG. 7 is a sectional view taken generally along the plane indicated by line 7—7 of FIG. 2.

Referring now to FIG. 1 of the drawings, a vehicle seat designated generally 10 includes a seat cushion 12 and a seat back 14 of conventional structure. A bracket 16 secured to the outboard side of the seat cushion structure and a bracket 18 secured to the like side of the seat back structure are pivotally interconnected at 20 to provide for tilting movement of the seat back 14 from its normal upright position, shown in full lines in FIG. 1, to a tilted position as shown in dash lines therein. Similar brackets are provided on the inboard side of the seat cushion and seat back structure. The seat back 14 may be locked in its normal upright position either by a manually releasable latch as known in the prior art or by an inertia latch also as known in the prior art, including those in current production use on vehicles manufactured by the assignee of this invention.

As shown in FIG. 2, the seat position control mechanism includes an inboard slave track arrangement 22 and an outboard control track arrangement 24. The inboard arrangement 22 includes a track assembly having a lower first generally U-shaped track member 26 having the base 28 thereof mounted to the floor pan of the vehicle by forward and rearward brackets 30. An upper second generally U-shaped track member 32 envelopes the track member 26 and is slidably supported with respect thereto by a spaced pair of cage and bearing assemblies 34. The details of the assemblies 34 are not shown since they are shown in Ragsdale U.S. Pat. No. 2,970,015, Cage and Bearing Assembly for Seat Adjuster Slide Structures assigned to the assignee of this invention. Generally, the assembly 34 includes a cage 36 which rotatably receives a roller 38 engageable with the base 28 of track member 26 and the base 40 of track member 32 to vertically space the track members with respect to each other. The rolled side edges of the cage each rotatably mount a ball bearing 42 which is received between respective opposed pairs of lateral flanges 44 and 46 of track members 26 and 32 in order to laterally locate the track members with respect to each other.

The outboard control track arrangement 24 includes upper and lower track assemblies 48 and 50 which are arranged in vertically stacked relationship. The assemblies 48 and 50 are the same as the track assembly of the inboard slave track arrangement and therefore like numerals are used for like parts. The lower outboard track assembly 50 is inverted as best shown in FIGS. 4, 5 and 6 and has the base 28 of the track member 26 thereof secured to the base 28 of the upper outboard track assembly 48 at a number of locations. The upper and lower outboard track assemblies have their respective track members 32 and 26 slidably supported on their respective track members 26 and 32 by cage assemblies 34.

The track member 32 of the lower outboard track assembly 50 is mounted to the floor pan of the vehicle by front and rear brackets 52. When the inboard track arrangement and the outboard track arrangement are mounted to the floor pan of the vehicle, the upper track assembly 48 of the outboard arrangement is generally located in laterally aligned relationship or generally horizontally coplanar with the track assembly of the inboard track arrangement.

By providing like inboard and outboard track assemblies, the seat position control mechanism of this invention makes maximum utilization of production tooling. Thus, while a vertically stacked pair of track assemblies is known in the prior art, each track assembly is of entirely different structure. Thus, multiple sets of tooling are required rather than having the ability to use the same tooling for all track assemblies of a seat position control mechanism. Further, prior art control mechanisms use like track arrangements both inboard and outboard of the seat rather than a single track assembly and a vertically stacked pair of track assemblies as in this invention.

A first latch mechanism 54 for releasably locking the upper track member 32 to the lower track member 26 of the upper outboard track assembly 48 includes a generally L-shaped member 56 having one leg thereof pivoted at 58 to the base 40 of track member 32. The other leg of member 56 includes a single T-shaped locking tooth 60 which extends laterally therefrom through an elongated opening 62 in the outboard side leg of track member 32. The tooth is receivable in any one of a number of longitudinally spaced openings 64 in the outboard side leg of the lower track member 26 to lock the seat in any one of a number of horizontally adjusted positions, corresponding to openings 64. A coil tension spring 66 hooked between the one leg of member 56 and the forward edge of track member 32 continually biases the tooth 60 into engagement with the openings 64. A manually operable handle portion 68 also extends laterally from the other leg of member 56. The handle portion is normally located as shown in full lines in FIG. 2 by spring 66 and by the engagement of tooth 60 with the outboard side leg of track member 32 to each side of an opening 64. The handle portion 68 is movable clockwise, as viewed in FIG. 2, against the bias of the spring 66 to its dash line position in order to move the tooth 60 out of engagement with an opening 64 and thereby permit adjustment of the seat.

A second latch mechanism 70 is provided to releasably lock the track member 26 of the lower outboard track assembly 50 to the track member 32 thereof. This latch mechanism includes a generally L-shaped latch member 72 which is pivoted at 74 to the base 40 of track member 32. A coil tension spring 76 is hooked between the forward edge of track member 32 and an apertured offset ear 78 of latch member 72 to bias the latch member counterclockwise as viewed in FIG. 2 or toward latched position to engage a single T-shaped tooth 80 of the latch member within a single opening of the track member 26 of the lower outboard track assembly 50 similar to opening 64. Tooth 80 moves within an opening similar to opening 62 in the inboard side leg of track member 32.

A slotted leg 82 of latch member 72 receives a cable 84 having a ball 86 fixed thereto. A like ball 88 is fixed to the other end of the cable which is received within a slot of an ear 90 of bracket 16. The rearward other end of cable 84 is thus fixed against movement by the engagement of ball 88 against ear 90. The one end is movable to rotate latch member 72 against the bias of spring 76. A sheath 92 slidably envelopes the major portion of cable 84. A fitting 94 fixed to the forward one end of the sheath has an annularly slotted tapered head thereof fitted within a slot in a leg of an L-shaped bracket 96, the other leg of which is fixed to the inboard side leg of track member 32 of the lower outboard track assembly as shown in FIGS. 2, 6 and 7. The rearward other end of the sheath is fixed to a fitting 98 which is slotted, FIG. 6, to permit cable 84 to extend therefrom through ear 90 of bracket 16. Fitting 98 includes an integral plunger 100 which slidably extends through an opening in ear 90. Normally the fitting engages the ear 90 as shown in FIG. 6. The plunger 100 is engageable by a lateral tab 102 of bracket 18 when the seat back 14 is tilted forwardly as will be described.

When it is desired to horizontally adjust the seat, the operator moves the handle portion 68 to its dash line position shown in FIG. 2 against the bias of spring 66 to move the tooth 60 out of engagement with an opening 64 to its dash line released position shown in FIG. 2. During horizontal movement of the seat, the track member 32 of the inboard track assembly moves relative to the track member 26 thereof and the track member 32 of the upper outboard track assembly likewise moves relative to the track member 26 thereof and also relative to the lower outboard track assembly. When the seat reaches the desired horizontal position, the operator releases the handle portion and spring 66 returns tooth 60 to latched position in engagement with an opening 64 corresponding to the desired position.

When it is desired to move the seat forwardly to the easy enter position 12B shown in dash lines in FIG. 1, the seat back 14 is tilted forwardly to position 14A to rotate bracket 18 counterclockwise relative to bracket 16 about the pivot 20 to its dash line position 14A. As the seat back moves to this position, the tab 102 of bracket 18 engages the plunger 100 of fitting 98 to slidably move this plunger downwardly or within the ear 90 of bracket 16 to move fitting 98 downwardly or away from ear 90. This bends or shortens the sheath 92 since the forward end thereof is fixed by the fitting 94 to the bracket 96. The cable 84 is correspondingly bent or shortened since it must move with the sheath 92 so that the cable thereby rotates latch member 72 clockwise about the pivot 74 as viewed in FIG. 2 to move the tooth 80 of this latch member out of engagement with the single opening in the track member 26 of the lower outboard track assembly 50 against the bias of spring 76. Thereafter the seat can be displaced forwardly to the easy enter position, 12B, 14B, 18B shown in FIG. 1 as the upper track member 32 of the inboard track assembly moves relative to the lower track member 26 thereof, and the upper outboard track assembly 48 and track member 26 of the lower outboard track assembly 50 move as a unit relative to the track member 32 of the track assembly 50. Once the seat has started to move toward the easy enter position, the seat back 14 can be returned to its normal upright position since the tooth 80 of the latch member 72 will merely slide along the outboard leg of track member 26 of track assembly 50.

In order to return the seat to the initial starting position, the seat back 14 is returned to its normal upright position and the seat moved rearwardly. When the seat back is returned to its upright position, the tab 102 disengages from the plunger 100 of fitting 98 so that the spring 76 again biases the latch member 72 counterclockwise to bias tooth 80 to latched position. However, since there is only one opening in the track member 26, the tooth 80 will merely move along the outboard leg of this track member during rearward movement of the seat. When the seat reaches its initial starting position, the tooth 80 will again engage the single opening in the track member 26 under the bias of spring 76 to lock the seat in initial starting position.

Thus this invention provides an improved seat position control mechanism.

The embodiments of the invention in which an exclusive property or privilege is claimed are defined as follows:

1. In a vehicle having a seat cushion and a seat back pivotally mounted to the seat cushion for forward tilting movement, a seat position control mechanism comprising, laterally spaced inboard slave and outboard control track arrangements for mounting the seat on the vehicle for horizontal movement to a plurality of adjusted positions and movement from one location to an easy enter position and return to the one location, the inboard slave track arrangement including a single track assembly including a pair of slidable members, one mounted to the vehicle and the other mounted to the seat, the outboard track control arrangement being comprised of an upper and a lower track assembly, one track member of each of the upper and the lower track assemblies being respectively mounted to the seat and to the vehicle and the other track members of the upper and lower track assemblies being secured to each other, first latch means releasably locking the one track member of the upper track assembly to the other track member of such assembly at a plurality of locations defining the horizontal adjusted positions of the seat, second latch means releasably locking the one track member of the lower track assembly to the other track member of such assembly at the one location, and means operated by tilting movement of the seat back for releasing the second latch means, said means including a fixed length cable member connected at one end thereof to the second latch means and connected at the other end thereof to the seat cushion, a sheath at least partially surrounding the cable member and having one end thereof fixed to the one track member of the lower track assembly and the other end thereof slidably mounted to the seat cushion, and means on the seat back engageable with means on the other end of the sheath upon tilting movement of the seat back for bending the sheath relative to the fixed one end thereof to thereby bend the cable member intermediate its ends and release the second latch means.

2. In a vehicle having a seat cushion and a seat back pivotally mounted to the seat cushion for forward tilting movement, a seat position control mechanism comprising, laterally spaced inboard and outboard track means for mounting the seat on the vehicle for horizontal movement to a plurality of adjusted positions and movement from one location to an easy enter position and return to the one location, the outboard track means including an upper and a lower track assembly, each including a pair of relatively slidable track members, one track member of each of the upper and the lower track assemblies being respectively mounted to the seat and to the vehicle, and the other track members of each of the upper and the lower track assemblies being secured to each other, a first latch member mounted to the one track member of the upper track assembly and releasably engageable with the other track member thereof at a plurality of locations to lock the seat in a plurality of horizontal adjusted positions, a second latch member mounted to the one track member of the lower track assembly and engageable under a resilient bias with the other track member of such assembly at the one location, a fixed length cable member having one end thereof slidably engageable with the second latch member and the other end thereof fixed to the seat cushion, a sheath at least partially surrounding the cable member and having one end thereof fixed to the one track member of the lower track assembly, plunger means on the other end of the sheath slidably mounted to the seat cushion, and an abutment on the seat back engageable with the plunger means of the sheath upon tilting movement of the seat back for bending the sheath relative to the fixed one end thereof to thereby bend the cable member intermediate its ends and move the second latch member to released position against the resilient bias.

3. In a vehicle having a seat cushion and a seat back pivotally mounted to the seat cushion for forward tilting movement, a seat position control mechanism comprising, laterally spaced inboard and outboard track means for mounting the seat on the vehicle for horizontal movement from one horizontal location to an easy enter position and return to the one location, the track means each including a pair of relatively slidable track members, one track member of the track means being mountable to the seat and the other track member of the track means being mountable to the vehicle, a latch member mounted to one track member of one track means and engageable under a resilient bias with the other track member of such track means at the one location, a fixed length cable member having one end thereof slidably engageable with the latch member and the other end thereof fixed to the seat cushion, a sheath at least partially surrounding the cable member and having one end thereof fixed to the said one track member of the said one track means, plunger means on the other end of the sheath slidably mounted to the seat cushion, and an abutment on the seat back engageable with the plunger means of the sheath upon tilting movement of the seat back for bending the sheath relative to the fixed one end thereof to thereby bend the cable member intermediate its ends and move the latch member to released position against the resilient bias.

* * * * *